Figure 1:
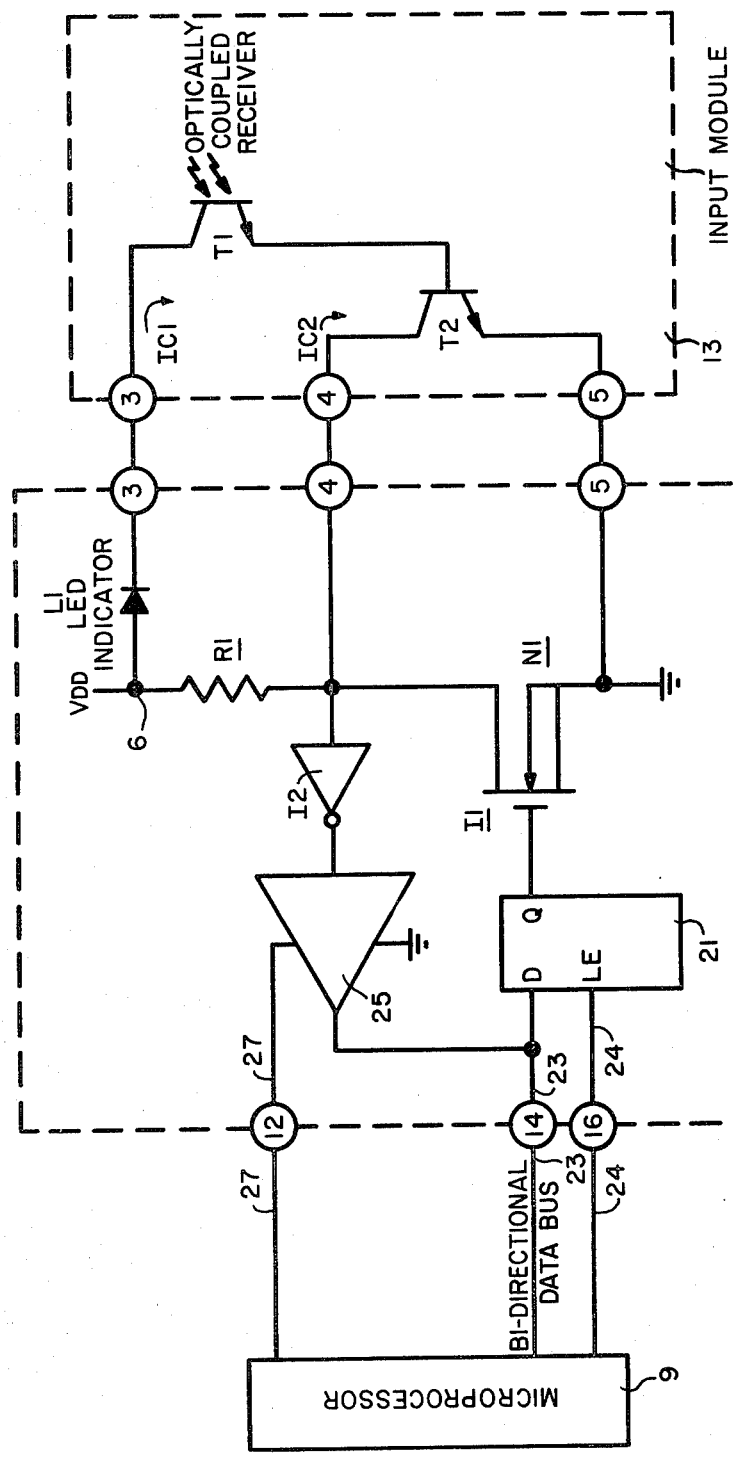

United States Patent [19]

Isham

[11] Patent Number: 4,471,243
[45] Date of Patent: Sep. 11, 1984

[54] BIDIRECTIONAL INTERFACE
[75] Inventor: Robert H. Isham, Somerville, N.J.
[73] Assignee: RCA Corporation, New York, N.Y.
[21] Appl. No.: 401,625
[22] Filed: Jul. 26, 1982
[51] Int. Cl.³ ............... H03K 17/693; H03K 19/094
[52] U.S. Cl. .............................. 307/475; 307/270; 307/584; 328/152
[58] Field of Search ............... 307/473, 475, 571, 577, 307/584, 270; 328/152; 340/707–708; 179/18 GF

[56] References Cited

U.S. PATENT DOCUMENTS

| | | | |
|---|---|---|---|
| 3,935,476 | 1/1976 | Paluck | 307/471 X |
| 3,953,748 | 4/1976 | Sugiura et al. | 307/475 |
| 4,183,095 | 1/1980 | Ward | 307/475 X |
| 4,197,471 | 4/1980 | Lackey et al. | 307/475 |

OTHER PUBLICATIONS

M6800 *Microprocessor Application Manual*, Motorola, Inc., 1975, pp. 4–22.

*Primary Examiner*—Stanley D. Miller
*Assistant Examiner*—David R. Hudspeth
*Attorney, Agent, or Firm*—Joseph S. Tripoli; George E. Haas; Henry I. Schanzer

[57] ABSTRACT

A bidirectional interface circuit whose signal terminals can function as either input or output terminals whereby the interface circuit can couple signals from a microprocessor to a load module or from a source module to the microprocessor.

10 Claims, 3 Drawing Figures

BIDIRECTIONAL INTERFACE

This invention relates to an interface circuit and, in particular, to a bidirectional interface circuit.

There are many applications in which it is desirable that a common transmission path be available for communication between a controlling device on the one hand and either a receiving device or a sending device, on the other hand. By way of example, in a particular microprocessor system using standard modules, a user may selectively plug in, for use with the microprocessor, modules performing completely different functions. For example, a microprocessor may be required either to supply signals to an output module (e.g. a loading module such as an optically coupled transmitter) or to receive signals from an input module (e.g. a signal generator module such as an optically coupled receiver). An interface circuit in the common transmission path between the controlling device and the input or the output module permits transmission in either direction desired. An interface circuit typically includes a first input-output (I/O) terminal to which the controlling device, such as a microprocessor, is connected and a second I/O terminal to which either an input or an output module is connected. First and second selectively enabled signal propagation paths are coupled in parallel between the two I/O terminals. When an output module is coupled to the second I/O terminal, the first path is enabled and signals are coupled from the first I/O terminal to the second I/O terminal for driving the output module. When an input module is coupled to the second I/O terminal, the second path is enabled and signals are coupled from the second I/O terminal to the first I/O terminal for processing by the microprocessor.

Where the data supplied by the microprocessor to the output module is time dependent, the first path of the interface circuit normally includes a latch circuit for storing microprocessor supplied data sampled at selected times. This requires the use of at least two signal lines between the microprocessor and the interface circuit, one to carry the data and the other to carry a control signal to sample the data. Furthermore, the data from the latch must be coupled to the output module via some kind of tri-state circuit. Using standard tri-state circuitry requires an additional control line to enable the tri-state circuit when data is fed from the microprocessor to the output module and to disable the tri-state circuit when data is fed from an input module via the interface circuit to the microprocessor.

In circuits embodying the invention, the need for the additional control line is eliminated.

An interface circuit embodying the invention includes a first I/O terminal to which a controlling device, such as a microprocessor, may be connected and a second I/O terminal to which either an output module or an input module may be connected. The interface circuit includes a first selectively enabled signal propagation path for coupling signals from the first I/O terminal to the second I/O terminal when an output module is coupled to, or plugged into, the interface circuit. The first path includes a latch connected between the first I/O terminal and the input to a buffer whose output is connected to the second I/O terminal. The buffer is of the type which for one binary condition of the latch provides a low impedance (clamp) condition between the second I/O terminal and a first point of operating potential and which for the other binary condition of the latch provides a relatively high impedance connection between the second I/O terminal and a second point of operating potential. The latch can be set to either binary condition by means of a data line and a control line. The latch in-turn sets the buffer either to the low impedance condition or to the high impedance condition. When an output module is coupled to, or plugged into the interface circuit the buffer is set, via the latch, to either impedance condition for driving the load module to either one of two conditions. When an input module is coupled to, or plugged into, the interface circuit the buffer is set, via the latch, to the high impedance condition causing very little loading of the input module signal. The interface circuit can then receive signals from the input module and couple them to the controlling device. The interface circuit functions to pass signals bidirectionally with no physical change in the interface circuit other than the connection of the appropriate input or output module to the interface circuit, and with the use of few components and few signal lines.

Figure 2:
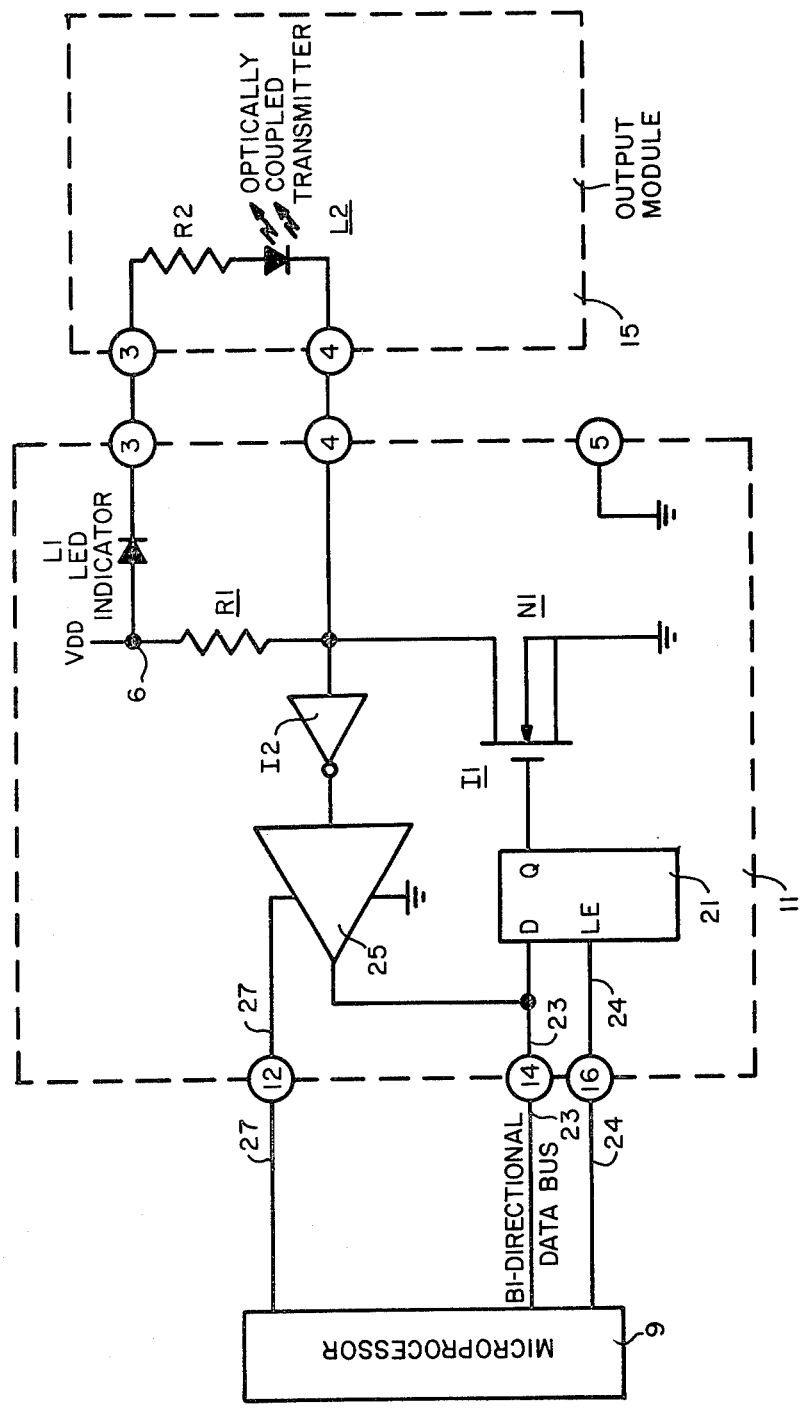
Figure 3:
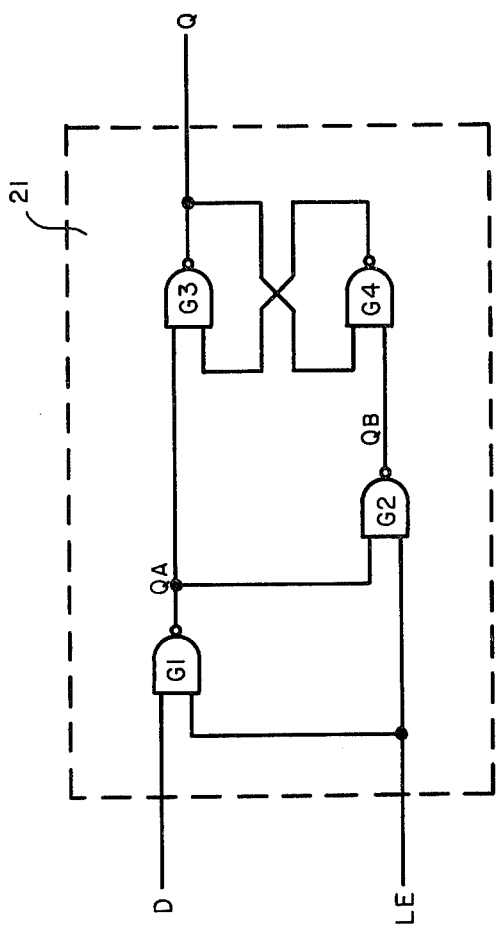

In the accompanying drawings like reference characters denote like components; and FIG. 1 is a diagram of an interface circuit embodying the invention coupled between a microprocessor and an input module;

FIG. 2 is a diagram of an interface circuit embodying the invention coupled between a microprocessor and an output module; and FIG. 3 is a logic diagram of a latch which may be used in the circuits of FIGS. 1 and 2.

The circuit of FIG. 1 includes a bidirectional input-output (I/O) interface circuit 11 coupled between a microprocessor 9 and an input module 13. I/O circuit 11 interconnects to microprocessor 9 via terminals 12, 14 and 16 and to module 13 via terminals 3, 4, and 5. In the instant system I/O circuit 11 is part of a circuit board external to microprocessor 9. However, I/O circuit 11 could be designed as part of the microprocessor.

Terminals 3, 4 and 5 of I/O circuit 11 are hard wired to like numbered terminals of a socket (not shown) into which either an input module 13 is inserted or plugged-in as shown in FIG. 1 or into which an output module 15 may be plugged-in as shown in FIG. 2.

I/O circuit 11 is a bidirectional interface circuit in that it includes means (a data latch 21 and an inverter I1) for providing signals at I/O terminal 4 corresponding to the signals applied to a data bus 23 and I/O terminal 14 by microprocessor 9, and means (an inverter I2 and a buffer 25) for producing on bus 23 and at I/O terminal 14 signals corresponding to those produced at I/O terminal 4 by input module 13.

Data latch 21 includes a data input (D) connected to I/O terminal 14 which is connected to microprocessor 9 via bidirectional data bus 23, a latch enable (LE) input connected to control terminal 16 which in turn is connected via control line 24 to microprocessor 9, and a data output (Q) connected to the gate electrode of a transistor N1. The gate electrode of N1 defines the input of an inverter I1 comprised of N1 and a passive load resistor R1. The drain electrode of N1 is connected to I/O terminal 4 and its source electrode is returned to ground. Resistor R1 is connected between terminal 4 and a node 6 to which is applied a positive (with respect to ground) operating potential of $V_{DD}$ volts.

An inverter I2 is connected at its input to terminal 4 and at its output to the input of a selectively enabled tri-state buffer 25. The output of buffer 25 which may be any one of a number of known tri-state buffers is connected to data bus 23.

The operability of buffer 25 is controlled by means of the signals applied by microprocessor 9 to control terminal 12 via a line 27. I/O circuit 11 also includes a light emitting diode (L1) connected at its anode to node 6 and at its cathode to terminal 3. When a current flows through L1 it lights up indicating current conduction. Terminal 3 may be used to supply a potential close to $V_{DD}$ volts to a module (e.g. 13) coupled to terminal 3. Terminal 4 is an I/O signal terminal and terminal 5 is connected to ground potential and can supply a ground return to a module coupled to terminal 5.

When an input module (e.g. 13) is "plugged" into the system, terminals 3, 4, and 5 of input module 13 are connected to the like numbered terminals of circuit 11 as illustrated in FIG. 1. For this condition the Q output of data latch 21 is set to the low level or logic "0" condition, which is at, or close to, zero volts. This is accomplished, for example, by programming the microprocessor to produce a "0" on data bus 23 and concurrently producing a pulse that goes from low-to-high-to-low on "LE" line 24. For ease of understanding the discussion to follow, note that latch 21 may be a D-type flip-flop comprising four 2-input NAND gates (G1, G2, G3, G4) as shown in FIG. 3. The operation of flip-flop 21 is known in the art and need not be greatly detailed. Its operation may be summarized as follows:

(a) If and when LE is low, QA and QB are set to the high level, and the data-input-(D) has no effect. Q remains set to the state (or value) to which it was set when LE was high.

(b) If and when LE is high G1 and G2 are primed and function as inverters; then, QA=$\overline{D}$ (i.e. the inverse of the value of the data-(D)-input) and QB=D. Q then gets set to the same value as D (i.e. Q=D).

When Q is low, N1 is turned-off and I1 is set to its high output impedance state, enabling the potential at I/O terminal 4 to be determined by the state of input module 13.

Input module 13 may include a phototransistor T1 having its emitter electrode connected to the base of a second transistor T2 which also may be (but need not be) a phototransistor. In response to a light input signal, T1 conducts a current IC1 which flows through light indicator L1 and via the collector to emitter path of T1 into the base of T2. The base current into T2 is multiplied by the beta of T2 to produce a collector current IC2 which flows through load resistor R1. Assuming that IC2×R1 is approximately equal to $V_{DD}$ volts, the voltage at terminal 4 will be at or close to zero volts. Thus, in response to a predetermined light signal input, the L1 indicator will be energized and the voltage at node 4 will be "low" (i.e. substantially below $V_{DD}/2$). On the other hand, if no light signal is present, T1 and T2 do not conduct (except for leakage current which may be neglected in this discussion). Thus, when no light signal is present, the voltage at node 4 is high (i.e. at or close to $V_{DD}$ volts). Note that R1 then functions to hold the voltage at terminal 4 at, or close to, $V_{DD}$ volts.

The "high" or "low" signal generated by input module 13 and applied to terminal 4 is applied to the input of inverter I2 whose output is applied to the input of selectively enabled non-inverting tri-state buffer 25. Buffer 25 is of the type which, when disabled, presents a very high impedance, essentially floating, at its output and which, when enabled, produces a signal at its output having the same binary value as its input. Buffer 25 is disabled when the signal applied to terminal 12 is low and is enabled when that signal is high. When buffer 25 is disabled it is essentially out of the circuit and it has very little, if any, effect on the voltage on data bus 23. Thus, when the control signal applied to terminal 12 by microprocessor 9 goes high, buffer 25 is enabled and it supplies a "high" or "low" output signal to I/O terminal 14 (depending upon the value of the input signal applied to inverter I2) and onto bus 23 for further processing by the microprocessor. Thus, if the input to I2 is "low", the "high" output produced at the output of I2 is coupled via enabled buffer 25 to terminal 14. Similarly, if the input to I2 is "high", I2 applies a "low" to buffer 25 which, when enabled, applied that low to terminal 14.

FIG. 2 illustrates the coupling of an output module 15 into the microprocessor system. Module 15 includes a light emitting diode (22) connected between terminals 3 and 4.

When the output module is coupled to bidirectional circuit 11, tri-state buffer 25 is initially disabled. This is accomplished, for example, by programming the microprocessor to produce a disable signal on line 27. The microprocessor is further programmed to supply data (i.e. either a "high" or a "low") onto data bus 23, which data is set into latch 21 when the microprocessor control signal coupled to line 24 and LE goes high. When LE goes high, the Q output of flip-flop 21 gets set to the value of the D input. Hence, if D is low, Q is set low; and if D is high, Q is set high. Following the setting of Q to the value of D, the LE signal can return to the low level, Q retains the value to which it was set when LE was high.

If Q is high, N1 is turned-on current is drawn through R1 and terminal 4 is pulled low. Since N1 is turned-on current is also drawn from $V_{DD}$ and flows via L1, R2, L2 and the source-drain path of N1 to ground. L1 and L2 then produce light signals. The light signal out of L2 may be coupled to a detector located adjacent to L2 or to another point within module 15.

If Q is low, N1 remains turned-off, I/O terminal 4 remains at or close to $V_{DD}$ and no current is drawn through L1 or L2. Then, L1 and L2 produce no light output.

It has thus been shown that data line 23 and control line 24 are the only two signal lines necessary to cause inverter I1 to drive output module 15 to either binary condition when the latter is connected into the circuit, or to place I1 in a high impedance condition (N1 turned-off) such that I2 is receptive to the signal from an input module 13 when the latter is connected into the circuit. The value of the data signal on data line 23 is thus used to turn I1 on and off when an output module is interconnected with circuit 11 and to turn I1 off when an input module is interconnected with circuit 11.

The output condition present within the interface circuit can subsequently be read back into the microprocessor by enabling buffer 25. The high or low at terminal 4 is fed back after an inversion onto line 23 and thus the signal originally supplied by the microprocessor and stored in latch 21 can be selectively returned to the processor as discussed below.

Assuming buffer 25 is enabled, if the potential (V4) at terminal 4 is high, the output of buffer 25 will be low and if V4 is low the D-input of latch 21 will be high. When the Latch Enable (LE) signal goes high, the Q output of latch 21 assumes the state of the D-input. Thus, if D is high Q goes high and if D is low, Q goes low. Thus, for V4 high Q will be low and for V4 low Q will be high. Since Q-high causes the potential (V4) at terminal 4 to be low and since Q-low causes V4 to be high, the condition present at I/O terminal 4 is readback and stored in the interface circuit.

When LE returns to the low level, the Q output of latch 21 remains in the state to which it was set when LE was high. Hence, the information produced at terminal 4 by output module 15 or input module 13 can get latched into flip-flop 21. This information can be selectively re-read-out onto line 23 by enabling buffer 25. Hence, the input information at terminal 4 can be latched into flip-flop 21 and whenever desired this information can be resupplied to the microprocessor.

It should be appreciated that the use of a passive load R1 enables either the interface circuit to drive an output module (e.g. 15) or an input module (e.g. 13) to drive load R1.

Tri-state buffer 25 and inverter I2 have been shown as two separate elements but they could instead be combined into a single selectively enabled tri-state inverting buffer.

The circuits of FIGS. 1 and 2 have been shown using inverters I1 and I2, however, it should be appreciated that I1 and I2 may be replaced by non-inverting buffers. However, in the case of I1 the buffer must include a high impedance condition, as for the case of I1 when N1 is turned off, and a low impedance condition.

What is claimed is:

1. A bidirectional interface circuit for coupling a controlling device to either a load module for receiving data signals or a source module for generating data signals comprising:
   a latching circuit having a data input, a data output, and a latch enable input coupled to receive a latch enable signal; and data output being settable to a value corresponding to the value of the data applied to said data input in response to the application of a latch enable signal to said latch enable input;
   a first input-output (I/O) signal terminal for receiving a data signal from said controlling device;
   means connecting said data input to said first I/O terminal;
   first inverting means having an input and an output;
   a second I/O signal terminal for connecting thereto either one of said load or source module;
   means connecting the input of said first inverting means to said data output and means connecting the output of said first inverting means to said second I/O signal terminal; and
   a second selectively enabled inverting means coupled to receive an enabling signal having an input connected to said second I/O terminal and having an output connected to said data input of said latching circuit and responsive to the application of an enabling signal for producing a signal at its output which is the inverse of the signal at its output.

2. The combination as claimed in claim 1 wherein said first inverting means includes an insulated-gate field-effect transistor (IGFET) having its source-to-drain conduction path connected between said second I/O terminal and a first point of operating potential; a passive load having an impedance connected between said second I/O terminal and a second point of operating potential; and
   wherein the gate electrode of said IGFET is connected to said data output of said latching circuit.

3. The combination as claimed in claim 2 wherein the impedance of said passive load is substantially greater than the ON impedance of said IGFET.

4. The combination as claimed in claim 3 wherein said second selectively enabled inverting means includes an inverter and a tri-state buffer.

5. The combination as claimed in claim 4 wherein said second selectively enabled inverting means is coupled to said controlling device and is responsive to an enabling signal produced by said controlling device; and
   wherein said latching circuit is coupled to said controlling device which produces latch enabling signals enabling the latching circuit to be selectively set.

6. The combination as claimed in claim 2 wherein said interface circuit further includes:
   a first power terminal connected to said first point of operating potential for applying the potential at said first point to a module connected to said first power terminal; and
   signal indicating means coupled between said second point of operating potential and a second power terminal for applying the potential at said second power terminal to a module connected to said second power terminal.

7. The combination as claimed in claim 1 wherein said interface circuit further includes: a first control terminal for receiving a latch enable signal from said controlling device and means connecting said latch enable input to said first control terminal, said latch circuit, when enabled for selectively sampling the value of the data input and storing the sampled value in said data latch; and
   a second control terminal for receiving an enabling signal from said controlling device and means coupling said second control terminal to said second selectively enabled inverting means for controlling when said second means is enabled or disabled.

8. A bidirectional interface circuit for coupling a controlling device to either a load module for receiving data signals or a source module for generating data signals comprising:
   a latching circuit having a data input, a data output, and a latch enable input, said data output being settable to a value corresponding to the value of the data signal applied to said data input when a latch enable signal is applied to said latch enable input;
   a first input/output (I/O) signal terminal for connecting said data input to said controlling device;
   first buffer means having an input and an output, said buffer means for producing a signal at its output corresponding to the value of the signal at its input, said first buffer means being characterized in that it exhibits a low output impedance for one value of input signal and a relatively high output impedance for another value of input signal;
   a second I/O signal terminal for connecting thereto either one of said load or source module;
   means connecting the input of said first buffer means to said data output for providing signals from said controlling device to said first buffer means having either said one or said another value when said load module is connected to said second I/O terminal and for providing signals of only said another value when said source module is connected to said second I/O terminal;

means connecting said output of said first buffer means to said second I/O signal terminal; and a second selectively enabled buffer means coupled to receive an enabling signal having an input connected to said second I/O terminal and having an output connected to said data input of said latching circuit, said second buffer means being responsive to the application of an enabling signal for producing a signal at its output corresponding to the signal applied to its input.

9. The combination as claimed in claim 8 wherein said first buffer means includes:

a transistor and a passive element, wherein the conduction path of said transistor is connected between said second I/O terminal and a first point of operating potential; and wherein said passive element is connected between said second I/O terminal and a second point of operating potential, and wherein when said transistor is turned-on it provides a low impedance between said second I/O and said first point of operating potential; and wherein when said transistor is turned-off there exists a relatively high impedance between said second I/O terminal and said second point of operating potential.

10. A bidirectional interface circuit for coupling a controlling device to either a load module for receiving data signals or a source module for generating data signals, comprising:

first and second input-output (I/O) signal terminals;

means for connecting said first I/O terminals to said controlling device;

means for connecting said second I/O terminal to either one of said load or source module;

a first selectively enabled signal propagation path coupled between said first and second I/O terminals for passing signals from said first I/O terminal to said second I/O terminal when a load module is connected to said second I/O terminal, said first path comprising a latch connected at its input to said first I/O terminal and having an output connected to the input of an inverter, the output of said inverter being connected to said second I/O terminal;

a second selectively enabled signal propagation path coupled between said first and second I/O terminals for passing signals from said second I/O terminal to said first I/O terminal when a source module is connected to said second I/O terminal; and means for receiving controlling signals from said controlling device coupled to said latch and to said second signal propagation path for selectively enabling selected ones of said first and second paths.

* * * * *